March 8, 1927.
L. E. HARMON
TROLLEY WHEEL
Filed Jan. 28, 1924
1,620,203
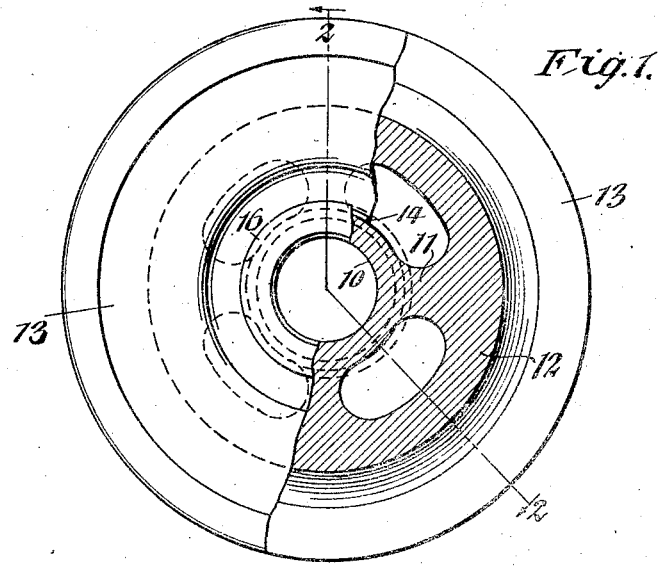
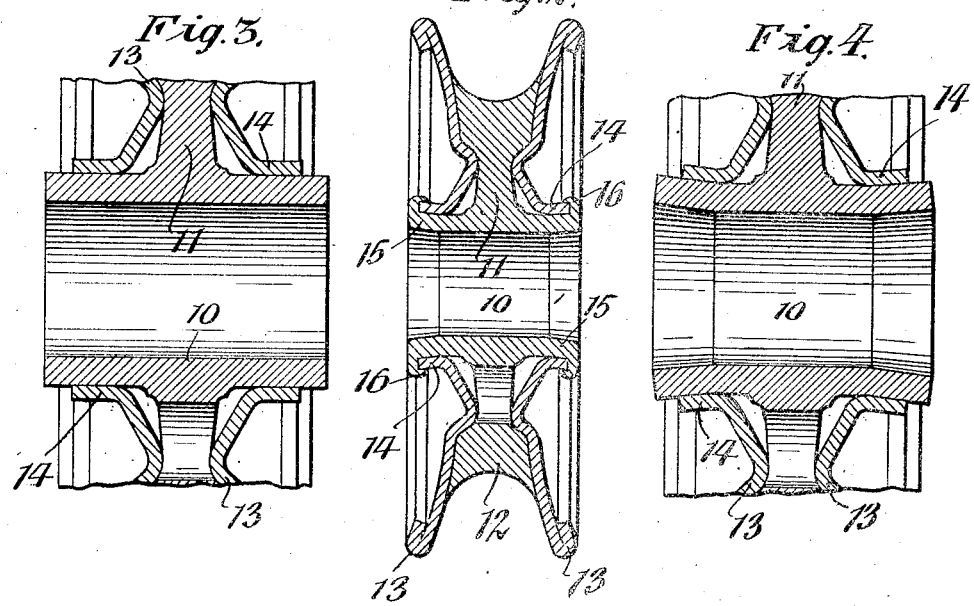
INVENTOR
Lawrence E. Harmon
by Roff & Powers
Att'ys.

Patented Mar. 8, 1927.

1,620,203

UNITED STATES PATENT OFFICE.

LAWRENCE E. HARMON, OF BUFFALO, NEW YORK, ASSIGNOR TO KATRINA T. HARMON, OF BUFFALO, NEW YORK.

TROLLEY WHEEL.

Application filed January 28, 1924. Serial No. 688,963.

This invention relates to a trolley wheel and has for its object the provision of a wheel of this character which permits of assembling its several elements economically and quickly and hold the same securely against dismemberment notwithstanding that the opposite ends of the hub have been worn considerably by use and thereby maintain the wheel in operative condition for a longer time.

In the accompanying drawings: Figure 1 is a side elevation, partly in section, of a trolley wheel embodying my invention. Figure 2 is a cross section of the same taken on line 2—2, Fig. 1. Figure 3 is a fragmentary longitudinal section, on an enlarged scale, of the central part of the wheel showing the several parts of the same assembled preparatory to being permanently connected. Figure 4 is a similar view showing the edges of the hub and collars of the disks pressed radially outward so that the same are permanently connected with each other.

Similar characters of reference indicate like parts throughout the several views.

The numeral 10 represents the tubular hub of the wheel which is adapted to receive the pin or axle whereby the same is pivotally mounted on the harp of the trolley pole. Arranged on the exterior of the hub between the ends thereof is a web 11 which is provided at its outer edge with an annular tread 12 adapted to engage with the trolley wire. The hub, web and thread are preferably formed integrally of any suitable metal such as bronze or copper. The opposite sides of the tread are engaged by two disks 13, 13 preferably of sheet steel which project with the outer peripheral edges beyond the tread so as to form flanges thereon whereby the trolley wire is retained in engagement with the tread. At its inner edge each disk is provided with a longitudinally outward projecting collar or neck 14 which surrounds the adjacent end of the hub.

For the purpose of holding the disks in engagement with the tread and preventing the collars thereof from turning or slipping off from the hub after those members have been assembled the ends of the hub are expanded or spread by suitable means so that the same engage frictionally with the bore of the collars and cause those parts to be connected so that they will not come apart when the wheel is in use. In the preferred construction the ends of the hub are expanded so that they are of outwardly flaring conical form, as shown at 15 in Figure 2, and engage their peripheries with the bore of the collars on the disk which are of corresponding outward flaring form, as shown in same figure. By these means the collars of the disks are not only connected frictionally with the ends of the hub but are also positively interlocked therewith so as to prevent the disks from being slipped off from the hub under the severest strains to which the wheel may be subjected in use.

In order to still further guard against separation of the disks and hub and also increase the wearing capacity of the ends of the hub these ends are turned or rolled laterally outward so as to form annular flanges or rims 16 which overlap the adjacent outer ends of the disk collars, as shown in Figures 1 and 2.

By these means an increased bearing area is provided at opposite ends of the hub for engagement with the contacts of the harp which conduct the electric current. As the flanges or rims 16 forming these bearing or contact surfaces wear away during use of the wheel, the disks are still firmly confined on the hub and held in engagement with the tread by reason of the frictional engagement of the hub ends with said collars and mechanical interlock between these parts due to the conical formation of the same which positively prevents the collars from moving longitudinally outward on the hub ends and loosening the disks.

It will therefore be apparent that this construction of trolley wheel is not only exceedingly strong, durable and simple and composed of few parts but the same provides a wheel which maintains its maximum usefulness and renders the highest service up to the time that it is completely worn out and must be replaced by a new wheel.

I claim as my invention:

1. A trolley wheel comprising a tubular hub, a web arranged on the exterior of the hub between the ends thereof, an annular tread arranged on the outer edge of said web, disks engaging with opposite sides of the tread and having their outer edges projecting beyond the tread while their inner edges are provided with longitudinally projecting collars which surround the ends of said hub and which are expanded into outwardly flaring conical form, said collars and hub ends being interlocked by expanding the ends of the hub into outwardly flaring conical form and engaging the peripheries of the same with the bore of said outwardly flaring collars.

2. A trolley wheel comprising a tubular hub, a web arranged on the exterior of the hub between the ends thereof, an annular tread arranged on the outer edge of said web, disks engaging with opposite sides of the tread and having their outer edges projecting beyond the tread while their inner edges are provided with longitudinally projecting collars which surround the ends of said hub and which are expanded into outwardly flaring conical form, said collars and hub ends being interlocked by expanding the ends of the hub into outwardly flaring conical form and engaging the peripheries of the same with the bore of said outwardly flaring collars and providing the outer edge of each end of the hub with a laterally projecting annular flange which overlaps the outer edge of the adjacent collar of the respective disk, said hub, web and tread being integral.

In testimony whereof I affix my signature.

LAWRENCE E. HARMON.